US012793407B2

(12) United States Patent
Kim et al.

(10) Patent No.: US 12,793,407 B2
(45) Date of Patent: Nov. 10, 2026

(54) SYSTEM AND METHOD FOR AUTOMATICALLY ANALYZING CLOUD COVER IN OPTICAL SATELLITE IMAGE BASED ON MACHINE LEARNING

(71) Applicant: KOREA AEROSPACE RESEARCH INSTITUTE, Daejeon (KR)

(72) Inventors: Min-A Kim, Daejeon (KR); Jihyeon Yim, Daejeon (KR); GuHyeok Kim, Daejeon (KR); JungNam Jun, Daejeon (KR); GabHo Jun, Daejeon (KR); MyeongShin Lee, Sejong-si (KR); Daewon Chung, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 499 days.

(21) Appl. No.: 18/073,416

(22) Filed: Dec. 1, 2022

(65) Prior Publication Data

US 2023/0169763 A1 Jun. 1, 2023

(30) Foreign Application Priority Data

Dec. 1, 2021 (KR) ........................ 10-2021-0170169

(51) Int. Cl.
*G06V 20/13* (2022.01)
*G06T 7/11* (2017.01)
(Continued)

(52) U.S. Cl.
CPC ................ *G06V 20/13* (2022.01); *G06T 7/11* (2017.01); *G06V 10/26* (2022.01); *G06V 10/764* (2022.01);
(Continued)

(58) Field of Classification Search
CPC ........ G06V 20/13; G06V 20/70; G06V 20/52; G06V 10/26; G06V 10/776; G06V 10/764; G06T 2207/10032
See application file for complete search history.

(56) References Cited

U.S. PATENT DOCUMENTS

2017/0357872 A1* 12/2017 Guan ............... G06V 30/19147
2021/0287052 A1* 9/2021 Wakui .................... G06V 20/69

FOREIGN PATENT DOCUMENTS

CN 111460921 A * 7/2020 ............. G06N 3/045
CN 111951284 A 11/2020
(Continued)

OTHER PUBLICATIONS

Espacenet English Translation of CN-112200787-A Description (Year: 2021).*
(Continued)

*Primary Examiner* — Sumati Lefkowitz
*Assistant Examiner* — Anthony J Rodriguez
(74) *Attorney, Agent, or Firm* — McCoy Russell LLP

(57) ABSTRACT

Provided is a system for automatically analyzing a cloud cover in an optical satellite image based on machine learning, and more particularly, a system for automatically analyzing a cloud cover in an optical satellite image based on machine learning capable of automatically analyzing a cloud cover in an optical satellite image through a machine learning model that re-defines object classes in the satellite image, classifies indicator characteristics of white ground surfaces, white objects, and the like, which are similar to each other in reflection characteristics, such as snow and ice, and detects a cloud cover on a pixel basis to improve a deterioration in accuracy of a conventional automatic cloud cover analysis method.

2 Claims, 7 Drawing Sheets

(51) Int. Cl.

| | |
|---|---|
| ***G06V 10/26*** | (2022.01) |
| ***G06V 10/764*** | (2022.01) |
| ***G06V 10/774*** | (2022.01) |
| ***G06V 10/776*** | (2022.01) |
| ***G06V 20/70*** | (2022.01) |

(52) U.S. Cl.
CPC .......... *G06V 10/774* (2022.01); *G06V 10/776* (2022.01); *G06V 20/70* (2022.01); *G06T 2207/10032* (2013.01)

(56) References Cited

FOREIGN PATENT DOCUMENTS

| | | | | | |
|---|---|---|---|---|---|
| CN | 112200787 A | * | 1/2021 | .......... | G06K 9/0063 |
| CN | 113096129 A | * | 7/2021 | | |
| KR | 20210032075 A | | 3/2021 | | |
| WO | 2020068744 A1 | | 4/2020 | | |

OTHER PUBLICATIONS

Espacenet English Translation of CN-113096129-A Description (Year: 2021).*
Waibel D J E et al., InstantDL: an easy-to-use deep learning pipeline for image segmentation and classification, 2021, Springer Nature (Year: 2021).*
Espacenet English Translation of CN-111460921-A Description (Year: 2020).*

* cited by examiner

| OBJECT CLASS | Thick Cloud | Thin Cloud | Cloud Shadow | Background |
|---|---|---|---|---|
| VALUE | True | True | True | False |
| WEIGHT VALUE | 1 | 0.7 | 0.7 | 0 |
| IMAGE INFORMATION |  |  |  |  |

| Type | SNOW/ICE | CITY | RIVER/SEA | FOREST | DESERT | OTHERS |
|---|---|---|---|---|---|---|
| Quantity(%) | 204(10.20%) | 358(17.90%) | 342(17.10%) | 690(34.50%) | 168(9.45%) | 217(10.85%) |
| Sample Image |  |  |  |  |  |  |

| ITEM | LEARNING DATA | TEST DATA |
|---|---|---|
| QUANTITY | 8,000 PIECES | 2,000 PIECES |
| FORMAT | K2: 8-Bit Catalog Image(RGB),<br>K3, K3A: 16-bit Catalog Image(RGBN) | |
| BY SATELLITE (%) | K2: 10%, K3: 40%, K3A: 50% | |
| BY CLOUD COVER GRADE (%) | 0: 1%, 1: 10%, 2: 7%, 3: 7%, 4: 8%, 5: 10%, 6: 14%, 7: 17%, 8: 25%, 9: 1% | |
| INDICATOR CHARACTERISTICS | X | Selection reflecting 6 types of geographical property |

FIG. 5

SYSTEM AND METHOD FOR AUTOMATICALLY ANALYZING CLOUD COVER IN OPTICAL SATELLITE IMAGE BASED ON MACHINE LEARNING

CROSS-REFERENCE TO RELATED APPLICATIONS

The present application claims priority to Korean Patent Application No. 10-2021-0170169, filed on Dec. 1, 2021. The entire contents of the above-listed application are hereby incorporated by reference for all purposes.

TECHNICAL FIELD

The following disclosure relates to a system and a method for automatically analyzing a cloud cover in an optical satellite image based on machine learning, and more particularly, to a system and a method for automatically analyzing a cloud cover in an optical satellite image based on machine learning capable of automatically analyzing a cloud cover in an optical satellite image through a machine learning model that re-defines object classes in the satellite image, classifies indicator characteristics of white ground surfaces, white objects, and the like, which are similar to each other in reflection characteristics, such as snow and ice, and detects a cloud cover on a pixel basis to improve a deterioration in accuracy of a conventional automatic cloud cover analysis method.

BACKGROUND

A multi-purpose practical satellite generates a standard image by eliminating or minimizing a geometric distortion of an image captured by the satellite and an error and noise included in a signal value of the image. An optical satellite provides a service for a user to easily read an optical image through a catalog search system by generating a list of standard images in a pre-processing stage.

At this time, since the list of standard images registered in the search system includes clouds, the search service is provided to enable a request for generating a standard image by analyzing a cloud occupancy according to a proportion of a cloud in an image and identifying a valid image satisfying a search condition.

Here, the proportion of the cloud is classified as a cloud cover grade defined as shown in Table 1 below, and catalog information is provided through the search system. The user performs a search by assigning a valid search condition to the corresponding grade, and as a result, selects a specific image from the retrieved valid images and requests a standard image generated for the specific image.

TABLE 1

| Grade | A | B | C | D | E |
|---|---|---|---|---|---|
| Cloud Rate(%) | 0 | 0-10 | 11-25 | 26-75 | 76-100 |

As the cloud cover grades are not further subdivided and the catalog is classified in a 16×16 grid form, detection performance is good when a cloud is thick with a predetermined size or more, but detection performance is poor when a cloud is small and thin.

In addition, snow, which spreads over a large area with a small amount of texture information, may be erroneously detected as a cloud. Therefore, a grid-based automatic cloud cover analysis technique has limitations in performance and location accuracy because an object is determined only from a portion of the grid.

Specifically, in a case where a cloud is thin with a small size, the cloud is not well detected. In addition, in a case where snow spreads over a large area with a small amount of texture information, the snow is erroneously detected as a cloud. Also, a shadow area caused by a cloud is not detected.

Therefore, it is acutely required to develop a more accurate and reliable cloud cover analysis system capable of detecting a cloud cover in which an intensity of a cloud, various indicator characteristics, and a shadow caused by a cloud are considered.

RELATED ART DOCUMENT

Patent Document

Korean Patent Laid-Open Publication No. 10-2021-0032075 (Publication Date: Mar. 24, 2021)

SUMMARY

An embodiment of the present invention is directed to providing a system and a method for automatically analyzing a cloud cover in an optical satellite image based on machine learning capable of not only improving accuracy and reliability in cloud cover analysis results by re-defining object classes for analyzing an occupancy of a cloud included in a list of standard images based on machine learning, classifying indicator characteristics having similar reflection characteristics, such as snow and ice, and detecting a cloud on a pixel basis, rather than detecting a cloud on a grid basis according to a conventional method, but also minimizing human resources required for analyzing a cloud cover, and increasing the usability of the satellite image such as removing haze or creating a mask layer for a cloud area using an analysis result value.

In one general aspect, a system for automatically analyzing a cloud cover in an optical satellite image based on machine learning includes: an image management unit receiving image information collected from a satellite, creating and storing a list of the collected image information, and determining whether or not the collected image information is new image information; a cloud cover calculation unit receiving the new image information from the image management unit and calculating a cloud cover based on machine learning; and a cloud cover information storage unit receiving and storing the cloud cover image information for which the cloud cover has been calculated from the cloud cover calculation unit, wherein the cloud cover calculation unit includes a machine learning-based cloud cover calculation model inputting the new image information received from the image management unit as an input pattern and outputting the image information for which the cloud cover has been calculated as an output pattern, and the cloud cover calculation model is generated by performing machine learning with an input data set being input thereto, the input data set including a plurality of pieces of image information and labels corresponding to object classes of the respective pieces of image information.

The cloud cover calculation model may be trained, with a weight value being assigned to each of the object classes, the object classes including a thick cloud, a thin cloud, a cloud shadow, and a background.

After being generated, the cloud cover calculation model may be evaluated with test data being input thereto, while proportions of indicators are reflected in the test data according to indicator characteristics.

The indicator characteristics may include snow/ice indicators, city indicators, river/sea indicators, forest indicators, desert indicators, and other indicators.

The cloud cover calculation model may use a semantic segmentation technique in which objects are detected by object class on a pixel basis within the image information.

In another general aspect, a method for automatically analyzing a cloud cover in an optical satellite image based on machine learning for calculating a cloud cover within image information collected from a satellite includes: a) generating, by a cloud cover calculation unit, a cloud cover calculation model by performing machine learning with an input data set being input thereto, the input data set including a plurality of pieces of image information collected from a satellite and labels corresponding to object classes of the respective pieces of image information; b) determining, by an image management unit, whether the image information collected from the satellite is new image information; c) calculating, by the cloud cover calculation unit, a cloud cover, with the image information determined by the image management unit as new image information being input to the cloud cover calculation model; and d) outputting, by the cloud cover calculation unit, the cloud cover image information for which the cloud cover has been calculated from the cloud cover calculation model, and transferring the cloud cover image information to the cloud cover information storage unit.

The cloud cover calculation model may be generated by performing machine learning with an input data set being input thereto, the input data set including a plurality of pieces of image information and labels corresponding to object classes of the respective pieces of image information.

The cloud cover calculation model may be trained, with a weight value being assigned to each of the object classes, the object classes including a thick cloud, a thin cloud, a cloud shadow, and a background.

The method may further include, between the step a) and the step b), al) evaluating, by the cloud cover calculation unit, the generated cloud cover calculation model with test data being input thereto, while proportions of indicators are reflected in the test data according to indicator characteristics, wherein the indicator characteristics include snow/ice indicators, city indicators, river/sea indicators, forest indicators, desert indicators, and other indicators.

The cloud cover calculation model may use a semantic segmentation technique in which objects are detected by object class on a pixel basis within the image information.

According to the present invention, it is possible to not only improve accuracy and reliability in cloud cover analysis results, but also minimize human resources required for analyzing a cloud cover, and increase the usability of the satellite image, for example, by removing haze or creating a mask layer for a cloud area using an analysis result value.

In addition, for a satellite image service, it is possible to evaluate a catalog as to validity depending on a cloud cover. By applying a cloud cover mask generated through the automatic cloud cover analysis system, it is possible to automatically determine whether to obtain an image at the time of evaluation of validity, thereby improving an image service speed.

BRIEF DESCRIPTION OF THE DRAWINGS

FIG. 5 is a diagram illustrating characteristics of learning data and test data according to the present invention.

DETAILED DESCRIPTION OF EMBODIMENTS

The term "unit", "device", "system", or the like described herein refers to a unit for processing an operation in which one or more functions are combined, and may be implemented by hardware, software, or a combination of hardware and software.

The term "unit", "device", "system", or the like as used herein may be treated as being equivalent to a computer related entity, i.e., hardware, a combination of hardware and software, software, or software at the time of execution. In addition, in the present invention, an application program to be executed may be configured in a "unit", and may be recorded in one physical memory in a readable, writable, and erasable form, or may be recorded in a distributed manner between two or more memories or recording media.

Hereinafter, the present invention will be described with reference to the accompanying drawings.

Figure 1:
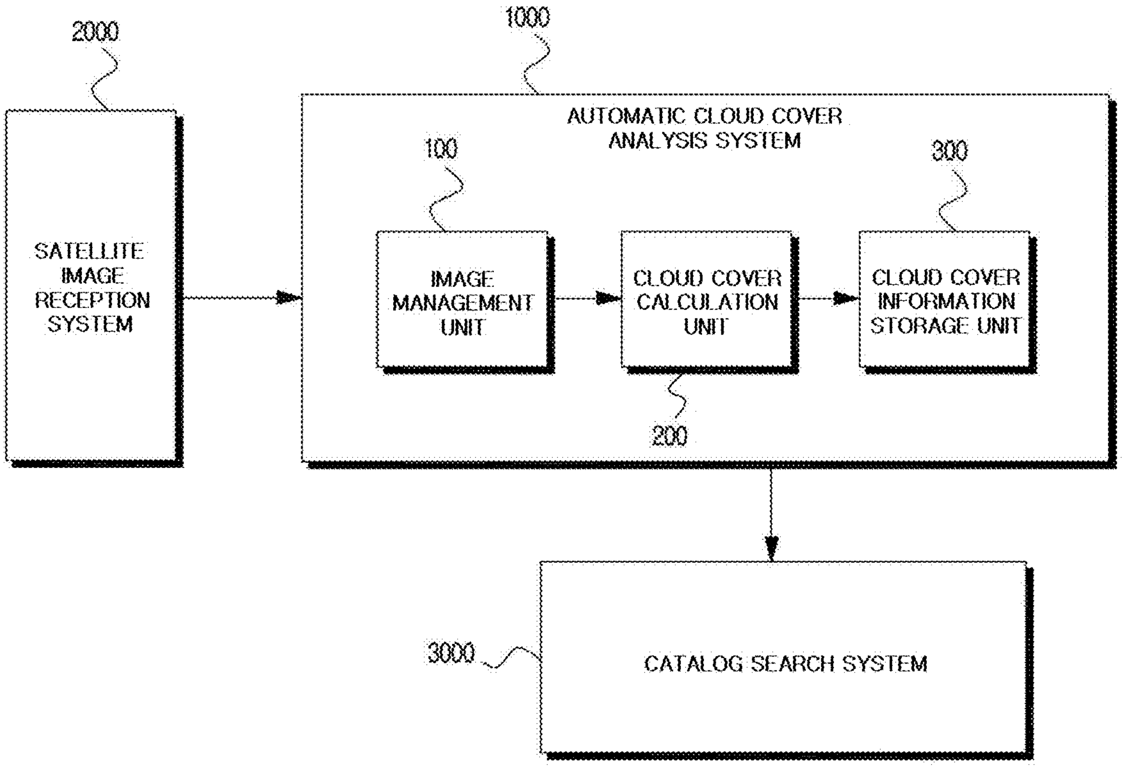
FIG. 1 is a block diagram illustrating a configuration of an automatic cloud cover analysis system according to an embodiment of the present invention.
Figure 2:
FIG. 2 is a diagram illustrating object classes and labels defined according to an embodiment of the present invention together with corresponding image information.
Figure 2:
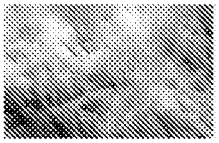
Figure 2:
Figure 2:
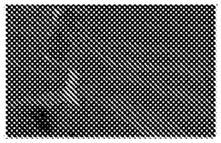
Figure 3:
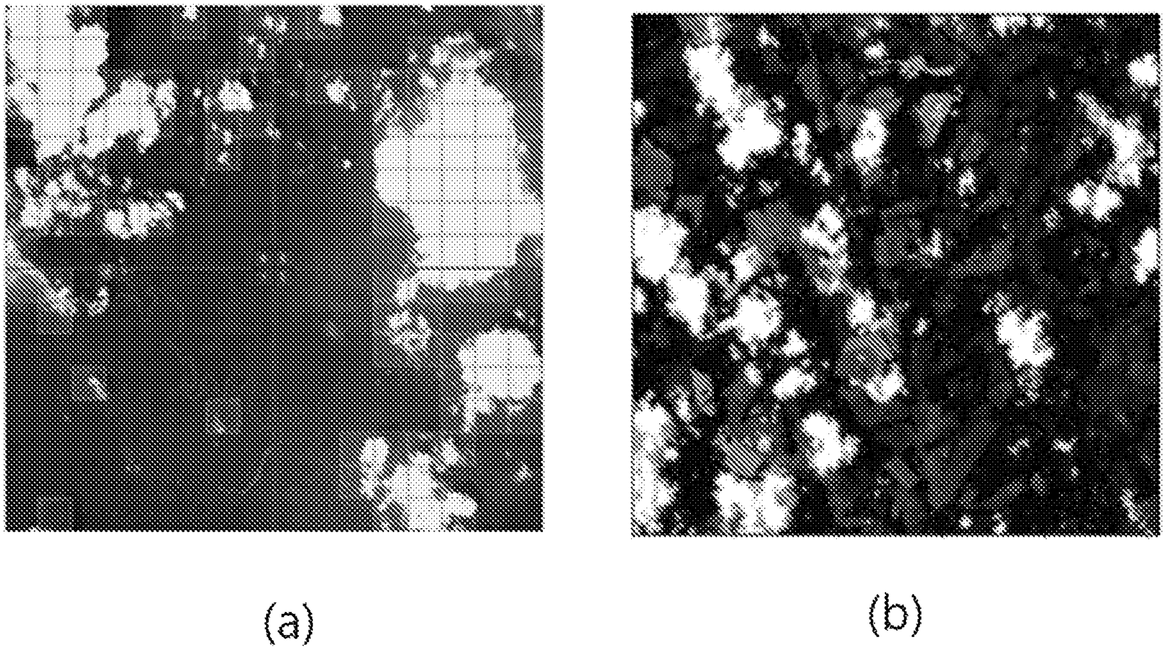
FIG. 3 is a diagram illustrating image information in which a grid-based detection method and a pixel-based detection method are compared according to an embodiment of the present invention.

FIG. 1 is a block diagram illustrating a configuration of an automatic cloud cover analysis system according to an embodiment of the present invention, FIG. 2 is a diagram illustrating object classes and labels defined according to an embodiment of the present invention together with corresponding image information, and FIG. 3 is a diagram illustrating image information in which a grid-based detection method and a pixel-based detection method are compared according to an embodiment of the present invention.

Figure 4:
FIG. 4 is a diagram illustrating indicator characteristics according to an embodiment of the present invention.
Figure 4:
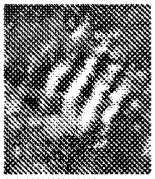
Figure 4:
Figure 4:
Figure 4:
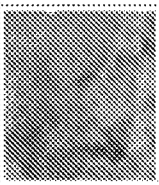
Figure 4:
Figure 6:
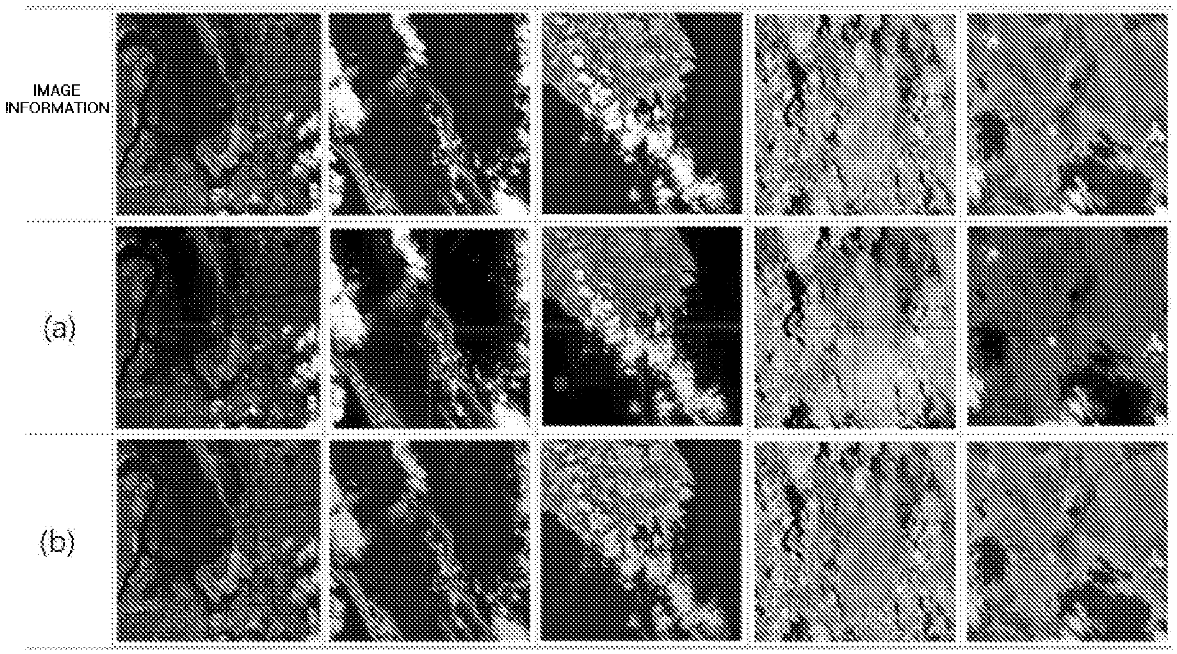
FIG. 6 is a diagram illustrating image information for various indicator characteristics in which the grid-based detection method and the pixel-based detection method are compared according to an embodiment of the present invention.

In addition, FIG. 4 is a diagram illustrating indicator characteristics according to an embodiment of the present invention, FIG. 5 is a diagram illustrating characteristics of learning data and test data according to the present invention, and FIG. 6 is a diagram illustrating image information for various indicator characteristics in which the grid-based detection method and the pixel-based detection method are compared according to an embodiment of the present invention.

Referring to FIG. 1, an automatic cloud cover analysis system 1000 according to an embodiment of the present invention largely includes: an image management unit 100 receiving image information collected from a satellite, creating and storing a list of the collected image information, and determining whether or not the collected image information is new image information; a cloud cover calculation unit 200 receiving the new image information from the image management unit 100 and calculating a cloud cover based on machine learning; and a cloud cover information storage unit 300 receiving and storing the cloud cover image information for which the cloud cover has been calculated from the cloud cover calculation unit 200.

Here, the image management unit 100 serves to receive raw captured image information from a satellite, create and manage a list of the received image information, determine whether the received image information is previously received image information or new image information, and transmit the new image information to the cloud cover calculation unit 200 when the received image information is determined as new image information.

If necessary, as illustrated in FIG. 1, a separate satellite image reception system 2000 may be provided to receive and store raw image information from a specific satellite according to a request of the image management unit 100.

Meanwhile, the cloud cover calculation unit 200 is provided to receive the new image information from the image management unit 100 and calculate a cloud cover based on machine learning. The cloud cover calculation unit 200 includes a machine learning-based cloud cover calculation model inputting the new image information received from the image management unit 100 as an input pattern and outputting image information for which a cloud cover has been calculated as an output pattern.

Here, the cloud cover calculation model is an artificial intelligence learning model generated through machine learning by receiving an input data set in advance, the input data set including a plurality of pieces of phase image information and labels corresponding to object classes of the respective pieces of image information. The cloud cover calculation model according to the present invention is configured to more accurately detect the objects by classifying objects into further subdivided object classes and assigning not only result value labels but also weight value labels to the object classes.

According to an embodiment of the present invention, as illustrated in FIG. 2, the cloud cover calculation model defines the object classes as a thick cloud, a thin cloud, a cloud shadow, and a background during machine learning to solve a problem that sensitivity depending on an intensity of a cloud deteriorates and a problem that is caused when a cloud shadow is not separately detected.

Furthermore, among the object classes, the thin cloud may further include fog or haze according to settings. Here, the haze refers to a phenomenon in which solid particles, rather than water vapor, reduce visibility.

In the present invention, the machine learning may be performed with a weight value set for each of the object classes. For example, as illustrated in FIG. 2, the weight value for the thick cloud may be set to 1, the weight value for the thin cloud may be set to 0.7, the weight value for the cloud shadow may be set to 0.7, and the weight value for the background may be set to 0.

Here, the weight value for the thin cloud may be differently set, for example, by increasing or decreasing the weight value as a result of calculating a proportion of the thin cloud in the image information and comparing the calculated proportion with a preset proportion (e.g., 80%).

Meanwhile, after being generated, the cloud cover calculation model according to the present invention may be evaluated with test data according to indicator characteristics. Here, the indicator characteristics include snow/ice indicators, city indicators, river/sea indicators, forest indicators, desert indicators, and other indicators, as illustrated in FIG. 4.

By performing machine learning for each indicator characteristic as described above, a cloud cover may be detected in consideration of reflectance or the like according to the indicator characteristic even when the objects are identically white in color.

In the test data illustrated in FIG. 4, the proportions of the snow/ice indicators, the city indicators, the river/sea indicators, the forest indicators, the desert indicators, and the other indicators are 10.20%, 17.90%, 17.10%, 34.50%, 9.45%, and 10.85%, respectively. The reason why they have different proportions is that there are relatively many forest indicators, city indicators, and river/sea indicators in the image information collected from the satellite.

As illustrated in FIG. 5, in an embodiment of the present invention, learning and evaluation were performed with a ratio of the learning data to the test data being 8:2, while the learning data and the test data were based on data classified into a total of 10 cloud cover grades.

For the evaluation through the test data, two matrices (Jaccard index and overall accuracy) were applied. In the evaluation based thereon, the target values of the Jaccard index and the overall accuracy for the thick cloud were set to 90% and 95%, respectively, and the target values of the Jaccard index and the overall accuracy for the thin cloud were set to 70% and 80%, respectively.

By performing the evaluation using the above-described test data, accuracy can be improved.

Meanwhile, as another feature of the present invention, the cloud cover calculation model uses a semantic segmentation technique in which objects are detected by object class on a pixel basis within the image information.

Here, the semantic segmentation technique is for classifying the objects in the image information into semantic units, and predicting which object class each pixel of the image information belongs to.

In this manner, prediction is performed for all the pixels in the image information. Therefore, the semantic segmentation technique is also called dense prediction. As a result, various types of objects such as clouds, rivers, seas, mountains, and buildings may be included in the image information received from the satellite.

By detecting the different types of objects on a pixel basis, the objects can be more clearly classified.

Accordingly, through the cloud cover calculation model of the cloud cover calculation unit 200 according to an embodiment of the present invention, it is possible to clearly detect whether or not there is a shadow caused by a cloud as well as an intensity of the cloud (thick cloud or thin cloud) in the image information, as illustrated in FIG. 6.

Meanwhile, the cloud cover information storage unit 300 is provided to receive and store the cloud cover image information for which the cloud cover has been calculated from the cloud cover calculation unit 200. As illustrated in FIG. 1, the cloud cover information storage unit 300 may also be configured to transmit the cloud cover image information for which the cloud cover has been calculated according to a setting or request to a catalog search system 3000.

Figure 7:
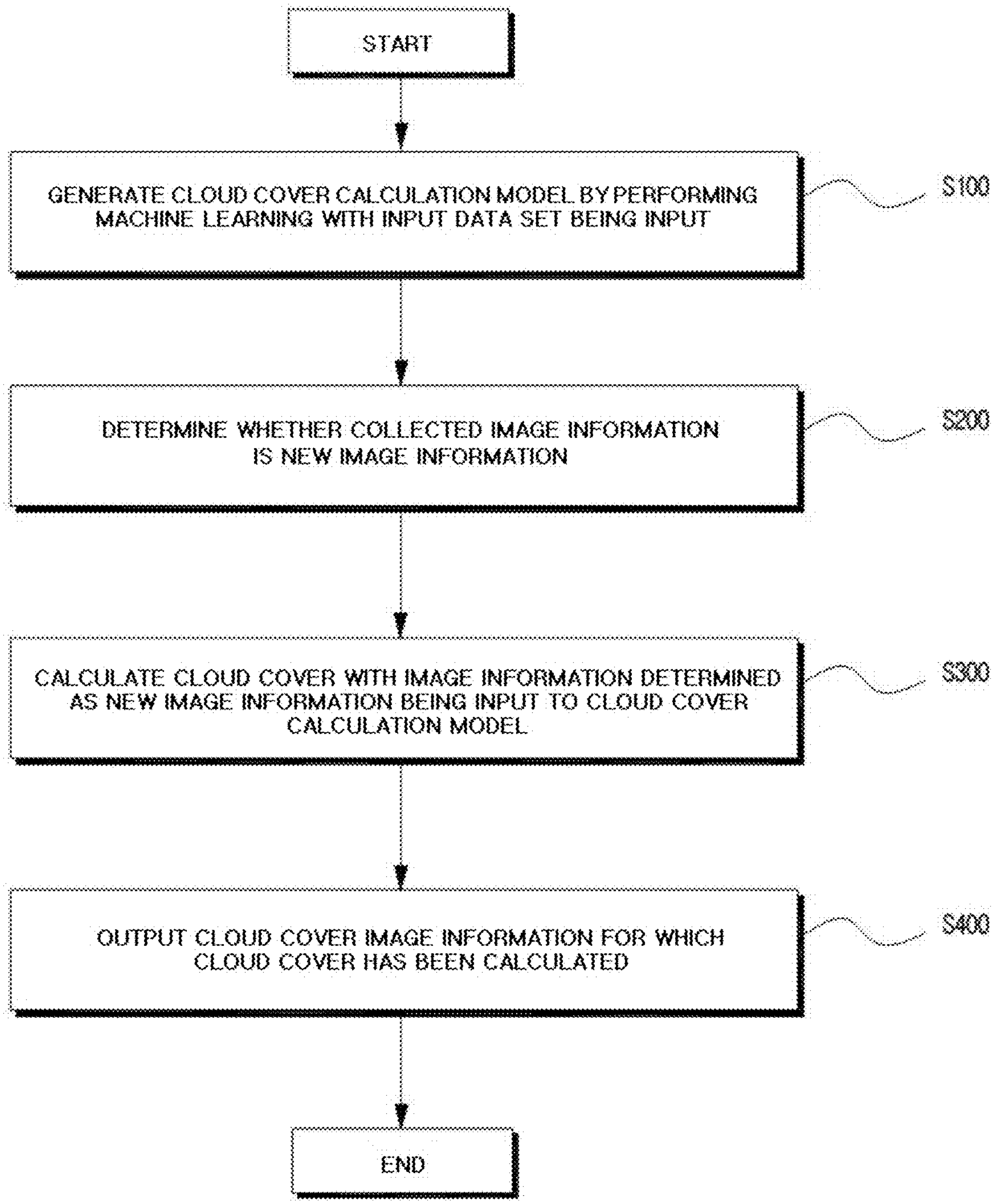
FIG. 7 is a flowchart illustrating a method for automatically analyzing a cloud cover in an optical satellite image based on machine learning according to an embodiment of the present invention.

FIG. 7 is a flowchart illustrating a method for automatically analyzing a cloud cover in an optical satellite image based on machine learning according to an embodiment of the present invention.

Referring to FIG. 7, the automatic cloud cover analysis system according to an embodiment of the present invention largely includes: generating, by the cloud cover calculation unit 200, a cloud cover calculation model by performing machine learning with an input data set being input thereto, the input data set including a plurality of pieces of image information collected from a satellite and labels corresponding to object classes of the respective pieces of image information (S100); determining, by the image management unit 100, whether the image information collected from the satellite is new image information (S200); calculating a cloud cover with the image information determined by the image management unit 100 as new image information being input to the cloud cover calculation model (S300); and outputting, by the cloud cover calculation unit 200, the cloud cover image information for which the cloud cover has been calculated from the cloud cover calculation model, and transferring the cloud cover image information to the cloud cover information storage unit 300 (S400).

As described for the automatic cloud cover analysis system 1000 above, in the automatic cloud cover analysis method, first of all, the cloud cover calculation unit 200 generates a cloud cover calculation model by performing machine learning with an input data set being input to the cloud cover calculation unit 200, the input data set including a plurality of pieces of image information collected from a satellite and labels corresponding to object classes of the respective pieces of image information (S100).

Here, the cloud cover calculation model is generated by performing machine learning with an input data set being input, the input data set including a plurality of pieces of image information and labels corresponding to object classes of the respective pieces of image information. The cloud cover calculation model is trained, with a weight value being assigned to each of the object classes, the object classes including a thick cloud, a thin cloud, a cloud shadow, and a background.

Furthermore, the thin cloud may further include fog or haze as an object class according to settings, and the weight value for the thin cloud may be differently assigned by comparing a proportion of the thin cloud in the image information with a preset proportion, so that the cloud cover calculation model is trained according to the weight value for the thin cloud.

In addition, in another embodiment of the present invention, the cloud cover calculation unit 200 may perform evaluation based on test data according to indicator characteristics input after the cloud cover calculation model is generated through the step S100. Here, the indicator characteristics include snow/ice indicators, city indicators, river/sea indicators, forest indicators, desert indicators, and other indicators, as illustrated in FIG. 4.

By additionally performing machine learning through the test data for each indicator characteristic as described above, a cloud cover may be detected in consideration of reflectance or the like according to the indicator characteristic even when the objects are identically white in color.

In addition, as described above, the cloud cover calculation model uses a semantic segmentation technique in which objects are detected by object class on a pixel basis within the image information.

Meanwhile, when the cloud cover calculation unit 200 generates a cloud cover calculation model by performing the step S100, the image management unit 100 determines whether the image information collected from the satellite is new image information (S200).

When it is determined that the image information collected from the satellite is new image information, a cloud cover is calculated with the new image information being input to the cloud cover calculation model (S300).

In addition, when the cloud cover is calculated, cloud cover image information is output from the cloud cover calculation model (S400), and transferred to and stored in the cloud cover information storage unit 300.

DETAILED DESCRIPTION OF MAIN ELEMENTS

100: Image management unit
200: Cloud cover calculation unit
300: Cloud cover information storage unit
1000: Automatic cloud cover analysis system
2000: Satellite image reception system
3000: Catalog search system

The invention claimed is:

1. A system implemented on one or more computing devices for automatically analyzing a cloud cover in an optical satellite image based on machine learning, the system comprising:

an image management unit receiving image information collected from a satellite, creating and storing a list of the collected image information, and determining whether or not the collected image information is new image information;

a cloud cover calculation unit receiving the new image information from the image management unit and calculating a cloud cover based on machine learning; and a cloud cover information storage unit receiving and storing the cloud cover image information for which the cloud cover has been calculated from the cloud cover calculation unit, wherein the cloud cover calculation unit includes a machine learning-based cloud cover calculation model inputting the new image information received from the image management unit as an input pattern and outputting the image information for which the cloud cover has been calculated as an output pattern, and wherein the output pattern is generated by the cloud cover calculation model by detecting objects by object class on a pixel basis, and the cloud cover calculation model is generated by performing machine learning with an input data set being input thereto, the input data set including a plurality of pieces of image information and labels corresponding to object classes of the respective pieces of image information, wherein after being generated, the cloud cover calculation model is evaluated with test data being input thereto, while proportions of indicators are reflected in the test data according to indicator characteristics, and wherein the test data is based on data classified according to the indicator characteristics, wherein the cloud cover calculation model, which performs semantic segmentation that classifies every pixel of the image information into object classes including thick cloud, thin cloud, cloud shadow, and background, is trained with class-specific weights, and a weight for the thin-cloud class is set differently depending on whether a ratio of thin cloud contained in the image information is at least a preset ratio, and wherein the weight for the thin-cloud class is differently set by increasing or decreasing the weight as a result of calculating the ratio of the thin cloud in the image information and comparing the calculated ratio with a preset ratio, wherein the indicator characteristics include snow/ice indicators, city indicators, river/sea indicators, forest indicators, desert indicators, and other indicators, and wherein the system is configured to provide cloud cover analysis result value in consideration of reflectance according to the indicator characteristics even when objects are identically white in color.

2. A method, implemented by one or more computing devices, for automatically analyzing a cloud cover in an optical satellite image based on machine learning for calculating a cloud cover within image information collected from a satellite, the method comprising:

a) generating, by a cloud cover calculation unit, a cloud cover calculation model by performing machine learning with an input data set being input thereto, the input data set including a plurality of pieces of image information collected from a satellite and labels corresponding to object classes of the respective pieces of image information;

b) determining, by an image management unit, whether the image information collected from the satellite is new image information;

c) calculating, by the cloud cover calculation unit, a cloud cover, with the image information determined by the image management unit as new image information being input to the cloud cover calculation model, wherein the cloud cover is calculated by the cloud cover calculation model by detecting objects by object class on a pixel basis; and d) outputting, by the cloud cover calculation unit, the cloud cover image information for which the cloud cover has been calculated from the cloud cover calculation model, and transferring the cloud cover image information to the cloud cover information storage unit, wherein between step a) and step b), the cloud cover calculation model is generated by performing a first machine learning with an input data set being input thereto, the input data set including a plurality of pieces of image information and labels corresponding to object classes of the respective pieces of image information, and after performing the first machine learning, additional machine learning is performed using test data and training data reflecting indicator characteristics in order to consider different reflectance based on the indicator characteristics, wherein the additional machine learning is additionally performed through the test data for each indicator characteristic, and wherein the training data and the test data are based on data classified according to the indicator characteristics, wherein the cloud cover calculation model, which performs semantic segmentation that classifies every pixel of the image information into object classes including thick cloud, thin cloud, cloud shadow, and background, is trained with class-specific weights, and a weight for the thin-cloud class is set differently depending on whether a ratio of thin cloud contained in the image information is at least a preset ratio, and wherein the weight for the thin-cloud class is differently set by increasing or decreasing the weight as a result of calculating the ratio of the thin cloud in the image information and comparing the calculated ratio with a preset ratio, wherein the indicator characteristics include snow/ice indicators, city indicators, river/sea indicators, forest indicators, desert indicators, and other indicators, and wherein the method is performed to provide cloud cover analysis result value in consideration of reflectance according to the indicator characteristics even when objects are identically white in color.

* * * * *